May 31, 1949.　　　D. C. BREAULT　　　2,471,859
PRESSURE REGULATING VALVE
Filed Nov. 18, 1944
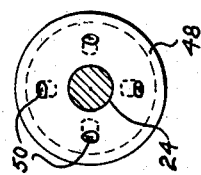
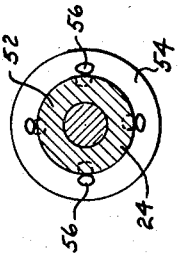
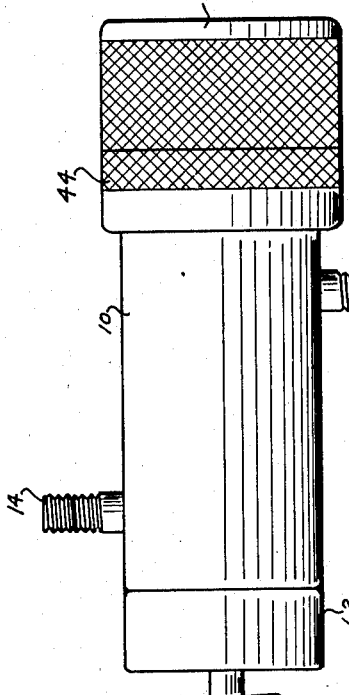
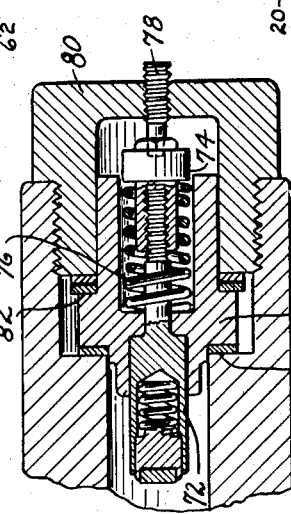
INVENTOR.
D. C. BREAULT
BY Charles R. Fay
atty Patented May 31, 1949

2,471,859

UNITED STATES PATENT OFFICE 2,471,859

PRESSURE REGULATING VALVE

Delphis C. Breault, Lowell, Mass.

Application November 18, 1944, Serial No. 564,005

1 Claim. (Cl. 277—64)

This invention relates to a valve particularly of the pressure regulating type including resilient means for determining the outlet pressure in combination with a quickly and easily manipulated device for controlling the flow through the valve in advance of a metering valve.

Objects of the invention include the provision of a dual control pressure regulating valve of the class described and comprising a housing having a chamber therein with an inlet and an outlet from the chamber, there being an automatic metering device at the outlet end of the chamber, said metering device being adjustable to vary the outlet pressure; in combination with a volume regulating device in the inlet end of the chamber, said volume regulating device being provided with a valve which is easily and quickly adjustable between a maximum and a minimum and also effective to close the valve completely regardless of the adjustment of the pressure metering valve.

Other objects and advantages of the invention will appear hereinafter.

Reference is to be had to the accompanying drawings, in which

Fig. 1 is a view in elevation showing a device according to the invention;

Fig. 2 is a view in longitudinal section through the device of Fig. 1;

Fig. 3 is a detail view of a part of the device;

Fig. 4 is a detail view of another part corresponding to that shown in Fig. 3; and Fig. 5 is a sectional view of a modified valve arrangement.

The present device comprises a housing 10 containing a chamber therein as at 12, an inlet 14 and an outlet 16. Housing 10 is exteriorly threaded as shown at 18 and interiorly threaded as at 20.

The inlet 14 and outlet 16 connect chamber 12 to the exterior of the housing 10 and a hollow cylindrical member 22 is disposed in chamber 12, this member having a shaft 24 fixed thereto for the purpose of rotating the same, a handle 26 being adaptable for this purpose. At the outlet end of chamber 12 a cap 24 is mounted in any desired manner, but as shown this cap may be mounted in the member 22 to close the same except for an orifice 26 leading from the interior of the member 22 to connect the same to the outlet 16.

The housing 10 is provided with an internal chamber 28 which is closed by a sliding plug 30, said plug extending toward the cap 24 and being provided with an annular shoulder 32. This extension of plug 30 is hollow and receives a plunger 34 which is slidable therein and is provided with a head 36, the latter being constantly urged to the left in Fig. 2 by means of a spring 38. The head 36 may be provided with an insert 40 which contacts and closes the aperture 26 in cap 24 by reason of the effect of spring 38. The plug 30 is held in adjusted position by a cap 42 threaded to the housing 10 at 18 and held in position by a lock nut 44. If desired a spring 46 may be utilized to urge plug 30 outwardly against cap 42 but this spring is not always necessary because spring 38 will have a similar effect.

It will be clear from the above description that the construction so far described provides a metering or pressure regulating valve since material under pressure flowing into the chamber through inlet 14 will impinge on the insert 40 and when sufficient pressure is developed the plunger 34 will be retracted to allow escape of said material but only to a degree regulated by the spring tension. This metering effect may be adjusted by cap 42 which will position plug 30 in the desired location so as to either increase or decrease the pressure of the material issuing from the inlet 16, but clearly this adjustment requires manipulation of the lock nut also and is comparatively slow.

The cylindrical member 22 is provided with a conical portion at 48, this conical portion being provided with a series of apertures 50. A disc or the like 52 is provided with a corresponding conical portion as at 54 and this portion is likewise provided with apertures 56 for registration with apertures 50. The disc 52 is secured to the housing as for instance by a pin 58 and it will thus be seen that as handle 26 is operated to rotate the member 22, the apertures 56 will be aligned in varying degrees with apertures 50 and in fact these apertures may be completely closed off from each other so as to shut off the valve from any material coming in through inlet 14. A spring 60 maintains the disc 52 in a position around its conical portion 54 continuously bears on the conical portion 48 of chamber 22. This spring is held in position by means of a closing cap 62.

The regulating valve at 24, 40 may be originally adjusted to the desired pressure by rotating cap 42 and locking it in position by the lock nut 44. This adjustment may be made either with the inlet valve in open or intermediate condition; in the latter case the volume may be either increased or decreased, as for instance for extraordinary operating conditions, merely by a slight turn of the shaft 24. In any case the entire valve may be shut off by shaft 24 without reference to the metering valve, and by suitable calibration the valve may be turned off for suitable intervals and merely repositioned as originally determined by turning the handle back to the operating position without variation of the metering valve adjustment. At the same time any extraordinary operating conditions which would ordinarily necessitate a complete resetting of the metering valve may be taken care of merely by turning shaft 24.

It will be clear that the valve here presented is capable of use in many different industries and applications and that it greatly simplifies the operation of a conventional metering valve as resetting is never necessary except by a simple manipulation of handle 26. Also it will be appreciated that the shoulder 32 will provide a stop for a substantially complete closing of the metering valve or for operation only at extreme pressure if this is desired.

An alternative metering valve construction is shown in Fig. 5 wherein a plug 70 receives a plunger 72 corresponding to that at 36. Plunger 72 extends through the plug and is provided with a head 74 forming a reaction point for a spring 76 to hold the plunger in adjusted position, a screw 78 is set in cap 80 to bear on head 74, so that the plunger is correctly adjustably positioned regardless of the cap 80. Washers 82 prevent escape of the material passing through the valve, and this construction may be used for extreme pressure installations.

Having thus described my invention and the advantages thereof, I do not wish to be limited to the details herein disclosed, otherwise than as set forth in the claim, but what I claim is:

A valve comprising a housing having a chamber, a rotatable hollow sleeve therein, said sleeve being conical at one end and having an aperture in the conical portion, a fixed conical wall abutting the conical sleeve portion, an aperture through said wall for registry or selective partial or non-registry with the sleeve aperture, means to rotate the sleeve, means to yieldingly press the wall and conical sleeve portion together, a separate cap for the sleeve at the end thereof opposite the conical portion, said cap having an aperture therethrough, and a yielding closure for the cap aperture.

DELPHIS C. BREAULT.

REFERENCES CITED

The following references are of record in the file of this patent:

UNITED STATES PATENTS

| Number | Name | Date |
|--------|------|------|
| 110,082 | Snyder | Dec. 13, 1870 |
| 139,878 | Dame | June 17, 1873 |
| 288,350 | Lauckner | Nov. 13, 1883 |
| 429,632 | Martyn | June 10, 1890 |
| 595,006 | Wascher | Dec. 7, 1897 |
| 726,355 | Schaefer | Apr. 28, 1903 |
| 1,608,120 | Price | Nov. 23, 1926 |
| 1,687,209 | Holmes | Oct. 9, 1928 |
| 1,823,599 | George | Sept. 15, 1931 |
| 2,241,537 | Buboltz | May 13, 1941 |